(12) United States Patent
Welles, II et al.

(10) Patent No.: US 6,417,890 B1
(45) Date of Patent: Jul. 9, 2002

(54) MODULATION OF PILOT TONE AMPLITUDE IN DTV BROADCAST FOR FASTER CHANNEL ACQUISITION

(75) Inventors: Kenneth Brakeley Welles, II, Scotia; John Erik Hershey, Ballston Lake; Mark Lewis Grabb, Burnt Hills, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/422,442

(22) Filed: Oct. 21, 1999

(51) Int. Cl.$^7$ .................................................. H04N 5/21
(52) U.S. Cl. ...................................... 348/614; 348/736
(58) Field of Search ................................ 348/469, 726, 348/420, 721, 614, 231; 375/348, 350, 231

(56) References Cited

U.S. PATENT DOCUMENTS

| | | | | |
|---|---|---|---|---|
| 5,602,602 A | * | 2/1997 | Hulyalkar | 348/607 |
| 5,684,827 A | * | 11/1997 | Nielsen | 375/232 |
| 6,211,924 B1 | * | 4/2001 | Patel et al. | 348/726 |
| 6,275,554 B1 | * | 8/2001 | Bouillet et al. | 375/371 |
| 6,300,984 B1 | * | 10/2001 | Limberg et al. | 348/614 |

\* cited by examiner

*Primary Examiner*—Victor R. Kostak
(74) *Attorney, Agent, or Firm*—John F. Thompson; Jill M. Breedlove

(57) ABSTRACT

The existing ATSC broadcast standard is modified to improve both the speed at which the periodically transmitted training sequence is found after channel selection by a viewer and the speed at which synchronization is achieved to a continuous wideband overlay signal used for equalization of the decoded signal. The modification involves slight amplitude modulation of the pilot signal in a manner synchronized with the transmission of the training sequences. The modulation of the pilot signal is sufficiently small to be ignored by existing ATSC receivers; that is, it is backwards compatible. Properly equipped receivers can detect, more quickly than receivers not so equipped, transmission of the training sequence by decoding this pilot signal modulation, thereby being capable of providing a decoded image to a viewer more quickly after a channel change than a receiver not so equipped. Additionally, the time required to synchronize to a continuous wideband overlay signal which has been provided for equalization is reduced, as by varying the modulation slightly to correspond to the start of a particular phase portion of the periodic sequence such as an m-sequence used for the overlay.

13 Claims, 2 Drawing Sheets

MODULATION OF PILOT TONE AMPLITUDE IN DTV BROADCAST FOR FASTER CHANNEL ACQUISITION

STATEMENT REGARDING FEDERALLY SPONSORED RESEARCH & DEVELOPMENT

The U.S. Government may have certain rights in this invention pursuant to the NIST Contract No. 70NANB8H4078, awarded by the National Institute of Standards and Technology.

BACKGROUND OF THE INVENTION

1. Technical Field

This invention relates to digital television (DTV) and, more particularly, to a modification of the existing Advanced Television Standards Committee (ATSC) broadcast standard to improve the speed at which the periodically transmitted training sequence is found after channel selection by a viewer.

2. Background Art

Digital television (DTV) signals in the USA are sent using the Advanced Television Standards Committee (ATSC) standard modulation system which is an eight level vestigial sideband (8-VSB) modulation with an offset and suppressed pilot signal. The television receiver must perform several complex steps to properly decode the incoming signal. One of these steps is to perform equalization on the incoming signal to reduce the effects of multipath distortion which might otherwise render the signal unusable. The ATSC standard signal periodically includes a training sequence specifically for the purpose of allowing channel equalization and multipath compensation.

One difficulty of using this signal for training is that distortion in the channel may make it difficult for the receiver to decode the incoming signal in order to find the training sequence. Knowing exactly when the training sequence was occurring would allow the receiver to more quickly perform equalization of the signal, and thereby reduce the amount of time between the viewer's selection of an ATSC channel and the display of a DTV program.

SUMMARY OF THE INVENTION

The present invention provides a modification of the existing ATSC broadcast standard to improve the speed at which the periodically transmitted training sequence is found after channel selection by a viewer. The speed at which synchronization is achieved to a continuous wideband overlay signal used for equalization of the decoded signal is also improved.

The pilot signal is modulated slightly in a manner synchronized with transmission of the training sequences. The modulation of the pilot signal is small enough that it is ignored by existing ATSC receivers; that is, the modulation is backwards compatible. Receivers using this invention can detect when the training sequence is being transmitted by decoding this pilot signal modulation. Receivers equipped with this invention are able to find the training sequence more quickly than receivers without the invention. As a result, properly equipped receivers will provide a decoded image to a viewer more quickly after a channel change than a receiver not so equipped. The invention has the additional benefit of reducing the time required to synchronize to a continuous wideband overlay signal which has been provided for equalization. This may be done by varying the modulation slightly to correspond to the start of a particular phase portion of a periodic sequence such as an m-sequence used for the overlay. For example, the conversion might be that the amplitude modulation reaches a maximum at the start of the particular phase portion or a submultiple such as, for example, every fifth start of a particular phase portion.

DETAILED DESCRIPTION OF THE INVENTION

Figure 1:
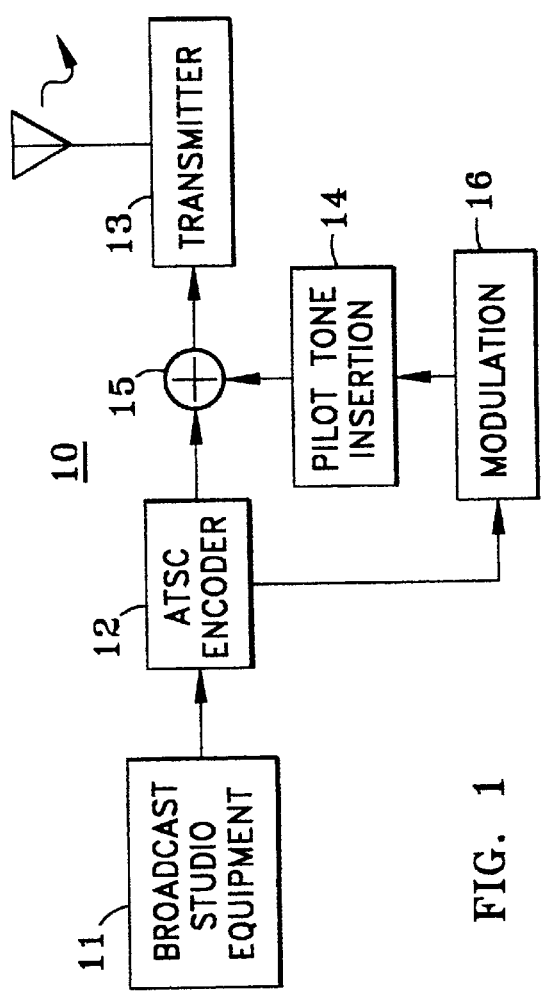
FIG. 1 is a block diagram of a transmitting system that amplitude modulates the pilot tone prior to insertion in the transmitted signal according to one embodiment of the invention.

FIG. 1 shows a transmitting system 10 according to one embodiment of the invention in which the pilot tone is amplitude modulated prior to insertion in the transmitted signal. More particularly, the broadcast studio equipment 11 generates a digital bit stream of video and audio program signals which is provided to an ATSC encoder 12 that generates an output signal to a transmitter 13; that is, in the ATSC format, studio equipment 11 converts the audio and video program into a stream of bits which is used by ATSC encoder 12 to modulate the transmitter 13 output signal in a manner known as eight level vestigial sideband (8-VSB) modulation. A pilot tone generated by a pilot tone generator 14 is added to the 8-VSB signal at a summer 15. This pilot tone is 2.69056 MHZ lower in frequency than the center frequency of the assigned transmission channel.

In one embodiment, the pilot tone is amplitude modulated by a small amount (for example, 0.5 dB) by a modulator 16 controlled by encoder 12. This modulation is periodic and may consist of one or more basic frequencies which are integer multiples of 1/0.024xx=4.xxx Hz, which is the repeat frequency of the training sequence. This modulation is further constrained such that there is a constant known phase relationship between the modulation and the appearance of the training sequence in the transmitted signal. One example of this modulation is a simple sine wave variation of the pilot tone where the sine wave amplitude is 0.5 dB of the specified pilot tone and the frequency is 40.xxx Hz, and the phasing of this sine wave is such that the greatest amplitude of the pilot tone occurs when the training sequence is present. Another example of this modulation is two superimposed sine waves, one at three times and one at seven times the repeat rate of the training sequence (12x.xxx and 28x.xxx Hz), each with 0.25 dB of amplitude modulation and phased such that the two sine waves have peak values simultaneously only during presence of the training sequence in the broadcast signal. In addition, the pilot tone modulation can be varied slightly to correspond to the start of a particular phase portion of the periodic sequence such as an m-sequence used for the wideband overlay signal employed for equalization, allowing faster synchronization of the overlay signal.

Figure 2:
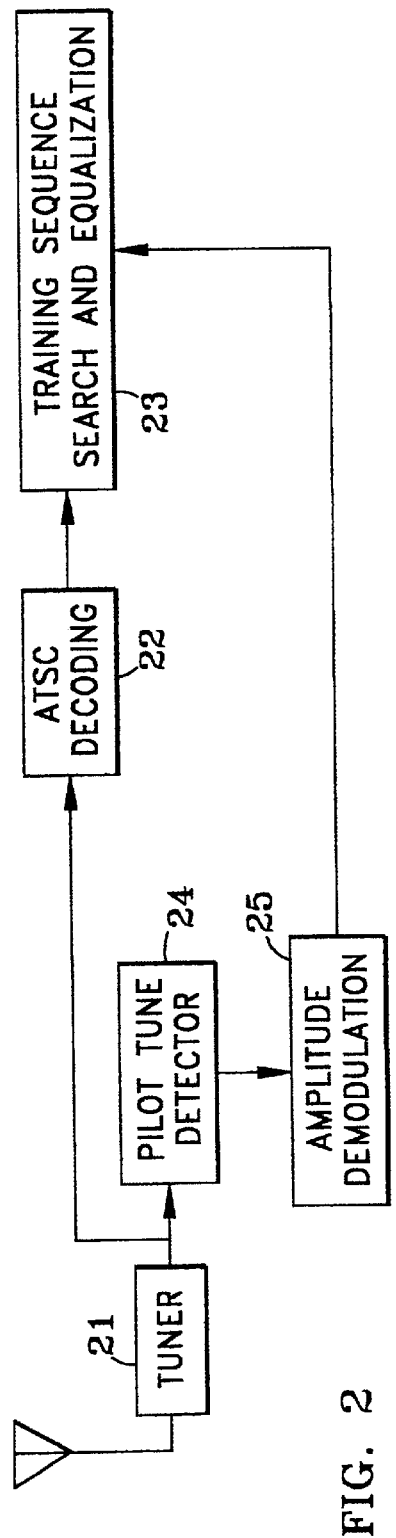
FIG. 2 is a block diagram of a receiver that detects and amplitude demodulates the received pilot tone used to speed up the training sequence search and equalization processing according to one embodiment of the invention.

FIG. 2 shows a DTV receiver equipped according to a preferred embodiment of the invention. The received signal is amplified and converted to an intermediate frequency (IF) signal in a tuner 21. The IF signal is provided to an ATSC decoding circuit 22 which performs the inverse of the coding applied to the bit stream that is provided to ATSC encoder 12 in the transmitting system of FIG. 1. The decoded bit stream is then supplied to the training sequence search and equalization circuits 23.

Figure 3:
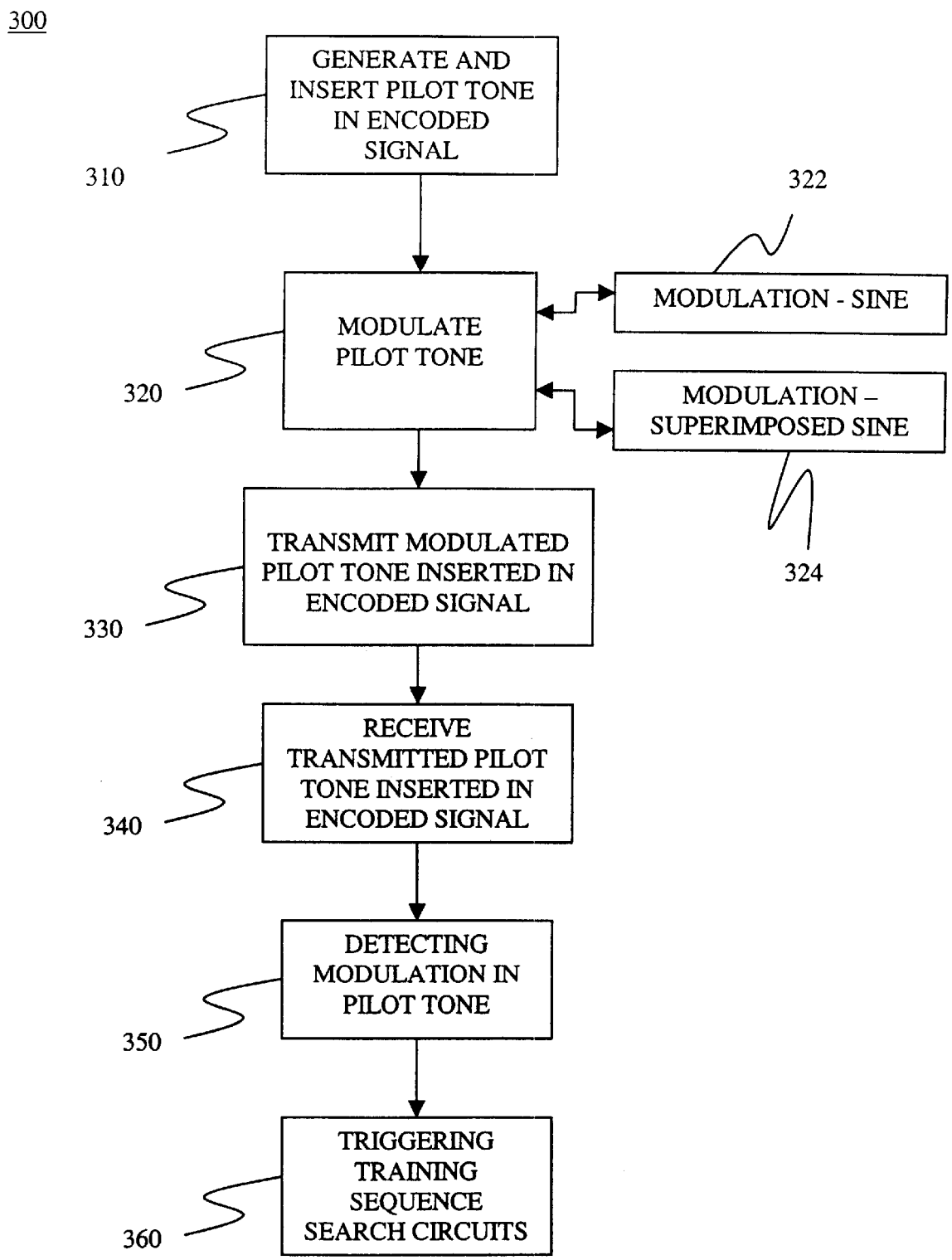
FIG. 3 is a flow diagram of one embodiment of a method for improving the speed of finding a periodically transmitted training sequence.

In another embodiment, as shown in FIG. 3, a method 300 for improving the speed of finding a periodically transmitted training sequence. A pilot tone is generated and inserted in the encoded signal by pilot tone generator 14 (step 310). The pilot tone is modulated by modulator 16 (step 320). As described hereinabove, the modulation used by the modulator 16 can comprise, in one embodiment, a simple sine wave variation (step 322) and, in another embodiment, a two superimposed sine wave variation (step 324). The transmitter 13 transmits the modulated pilot tone inserted in the encoded signal (step 330). The transmitted pilot tone inserted in the encoded signal is received (step 340). The pilot tone detector 24 responsive to tuner 21 detects the 2.69056 MHZ signal present in the ATSC broadcast signal (step 350). This detector may be implemented as a digital filter or as an analog tuned circuit. The output signal of this pilot tone detector is examined in an amplitude modulation detector 25 for minor amplitude modulation impressed as in the transmitting system of FIG. 1. The detected amplitude modulation is then used by training sequence search and equalization circuits 23 to determine when the training sequence is present in the incoming signal (step 360). This information then triggers the training sequence search and equalization circuits 23 to perform the appropriate training and channel equalization for faster channel acquisition and equalization. The detected amplitude modulation may also be used to reduce synchronization time to a continuous periodic overlay sequence by reducing the uncertainty of the beginning of a particular and known portion of the sequence.

While only certain preferred features of the invention have been illustrated and described, many modifications and changes will occur to those skilled in the art. It is, therefore, to be understood that the appended claims are intended to cover all such modifications and changes as fall within the true spirit of the invention.

Having thus described our invention, what we claim as new and desire to secure by Letters Patent is:

1. A digital television (DTV) system comprising:
   a transmitting system comprising:
      a transmitter;
      broadcast studio equipment connected to said transmitter for generating a digital bit stream of video and audio program signals;
      an encoder connected to said broadcast studio equipment and responsive to said broadcast studio equipment for supplying an encoded signal to said transmitter;
      a pilot tone generator connected to said encoder and said transmitter for inserting a pilot tone into said encoded signal; and
      an amplitude modulator connected to said pilot tone generator and said encoder for modulating the pilot tone in a manner synchronized with transmission of training sequences in the encoded signal wherein the modulation produced by said amplitude modulator is about 0.5 dB; and
   a receiving system comprising:
      training sequence search circuits;
      a tuner connected to said training sequence search circuits and responsive to said transmitter;
      a decoder connected to said tuner and said training sequence search circuits and responsive to said tuner for decoding the encoded signal received from said transmitter and providing the decoded signal to the training sequence search circuits;
      a pilot tone detector connected to said tuner; and
      a demodulator connected to said pilot tone detector and said training sequence search circuits and responsive to said pilot tone detector for generating an output signal to trigger said training sequence search circuits to find the transmitted training sequences.

2. The DTV system of claim 1, wherein the modulation produced by said amplitude modulator is a sine wave phased such that the pilot tone has a maximum amplitude when the training sequence is present in the encoded signal.

3. The DTV system of claim 1, wherein the modulation produced by said amplitude modulator consists of two superimposed sine waves of different frequencies phased such that both sine waves have coincident peak values only when the training sequence is present in the encoded signal.

4. The DTV system of claim 1, wherein the transmitter is adapted to transmit a wideband overlay signal for use by the receiver for equalization, and wherein the amplitude modulator is adapted to modulate the pilot tone in a manner to correspond to the start of a particular phase portion of a periodic sequence used for the overlay signal.

5. A method of improving the speed at which a periodically transmitted training sequence is found in a digital television (DTV) system, the method comprising the steps of:
   transmitting a pilot tone inserted in an encoded signal, the pilot tone being modulated in a manner synchronized with transmission of training sequences in the encoded signal;
   receiving the transmitted pilot tone; and
   detecting modulation on the pilot tone to generate an output signal for triggering training sequence search circuits to find the transmitted training sequences wherein the modulation of the pilot tone is amplitude modulation at about 0.5 dB.

6. The method of claim 5, wherein the modulation of the pilot tone is a sine wave phased such that the pilot tone has a maximum amplitude when the training sequence is present in the encoded signal.

7. The method of claim 5, wherein the modulation of the pilot tone consists of two superimposed sine waves of different frequencies phased such that both sine waves have coincident peak values only when the training sequence is present in the encoded signal.

8. The method of claim 5, further comprising the step of transmitting a wideband overlay signal for use in equalization, and wherein the pilot tone is modulated to correspond to the start of a particular phase portion of a periodic sequence used for the overlay signal.

9. A digital television (DTV) receiver for processing a pilot tone inserted in an encoded signal transmitted by a DTV transmitter, the pilot tone being modulated in a manner synchronized with transmission of training sequences transmitted in the encoded signal, said receiver comprising:
   training sequence search circuits;
   a pilot tone detector connected to said training sequence search circuits; and
   a demodulator connected to said pilot tone detector and responsive to said pilot tone detector for generating an output signal to trigger said training sequence search circuits to find the transmitted training sequences wherein the pilot tone is amplitude modulated at about 0.5 dB.

10. The DTV receiver of claim 9, wherein the modulation of the pilot tone is a sine wave phased such that the pilot tone has a maximum amplitude when the training sequence is present in the encoded signal.

11. The DTV receiver of claim 9, wherein the modulation of the pilot tone consists of two superimposed sine waves of different frequencies phased such that both sine waves have coincident peak values only when the training sequence is present in the encoded signal.

12. The DTV receiver of claim 9, wherein the transmitter is adapted to transmit a wideband overlay signal for use by the receiver for equalization, and wherein the pilot tone is modulated in an manner to correspond to the start of a particular phase portion of a periodic sequence used for the overlay signal.

13. A method of improving the speed at which a periodically transmitted training sequence is found in a digital television (DTV) system, the method comprising the steps of:

generating and inserting a pilot tone into an encoded signal;

modulating the pilot tone in a manner synchronized with transmission of training sequences in the encoded signal wherein the modulation is amplitude modulation at about 0.5 dB;

transmitting the encoded signal and the modulated pilot signal;

receiving the transmitted encoded signal and the modulated pilot signal;

detecting modulation on the pilot tone to generate an output signal; and triggering training sequence search circuits based on the output signal to find the transmitted training sequences.

* * * * *